United States Patent [19]

Yanagihara

[11] 4,364,528
[45] Dec. 21, 1982

[54] RETRACTOR FOR SEAT BELT PROVIDED WITH BUFFER MEANS AGAINST WEBBING TAKING UP FORCE

[75] Inventor: Hideo Yanagihara, Fujisawa, Japan

[73] Assignee: NSK-Warner K.K., Tokyo, Japan

[21] Appl. No.: 214,094

[22] Filed: Dec. 8, 1980

[30] Foreign Application Priority Data

Dec. 13, 1979 [JP] Japan .......................... 54/171623[U]
Jan. 30, 1980 [JP] Japan ............................ 55/10088[U]
Mar. 21, 1980 [JP] Japan ............................ 55/35771[U]

[51] Int. Cl.³ ...................... A62B 35/00; B65H 75/48
[52] U.S. Cl. ................................................. 242/107.7
[58] Field of Search ............ 242/107.7, 107.6, 107.12, 242/107.4 R, 107.4 AE; 280/806, 807, 808, 803; 297/474–478

[56] References Cited

U.S. PATENT DOCUMENTS

| | | | |
|---|---|---|---|
| 4,002,311 | 1/1977 | Fisher et al. | 242/107.7 |
| 4,065,155 | 12/1977 | Rogers | 242/107.7 X |
| 4,106,722 | 8/1978 | Inukai et al. | 242/107.7 |
| 4,124,175 | 11/1978 | Cislak | 242/107.7 |
| 4,149,683 | 4/1979 | Fisher et al. | 242/107.7 |
| 4,165,054 | 8/1979 | Collins | 242/107.7 |
| 4,270,709 | 6/1981 | Inukai | 242/107.7 |

*Primary Examiner*—John M. Jillions
*Attorney, Agent, or Firm*—Shapiro and Shapiro

[57] ABSTRACT

Improvements in a retractor for seat belt are disclosed. The improved retractor for seat belt comprises a particular and simple cam plate having three differently shaped guide surfaces for guiding a ratchet engageable with a ratchet wheel to prevent the webbing taking up rotation of a webbing take-up shaft.

8 Claims, 17 Drawing Figures

RETRACTOR FOR SEAT BELT PROVIDED WITH BUFFER MEANS AGAINST WEBBING TAKING UP FORCE

BACKGROUND OF THE INVENTION

1. Field of the Invention

The present invention generally relates to a retractor for seat belt provided with buffer means for moderating the webbing taking up or winding force applied to the belt wearer. More particularly, the present invention relates to such seat belt retractor provided with buffer means comprising a detent mechanism and a cam plate.

2. Description of the Prior Art

Various retractors provided with buffer means have already been proposed and used. However, many of them require a relatively large number of components and have a complicated structure. Further, in general, they lack flexibility in design. Therefore, it has been desired for a long time to further improve them in respect of the above drawbacks.

SUMMARY OF THE INVENTION

Accordingly, it is a general object of the invention to provide a seat belt retractor which includes a detent mechanism and a specific cam plate to eliminate the disadvantages and drawbacks involved in the prior art retractors provided with buffer means.

Other and further objects, features and advantages of the invention will appear more fully from the following description taken in connection with the accompanying drawings.

DESCRIPTION OF THE PREFERRED EMBODIMENTS

In the first embodiment shown in FIGS. 1 through 6, a retractor base 1 rotatably supports a take-up shaft 2 to which the inner end of a webbing W is fixed. The take-up shaft 2 is biased by a take-up spring 3 in the webbing taking up direction (clockwise as viewed on the drawing of FIG. 1). Within the base 1 and near the both ends of the take-up shaft 2 there are provided relatively large ratchet wheels 4 and 5 formed integrally with the shaft 2. The ratchet wheels 4 and 5 are engageable with a stopper (not shown). When a vehicle speed change sensor (not shown) detects a predetermined level of change in vehicle speed, the stopper comes into mesh with the ratchet wheels 4 and 5 to stop the rotation of the shaft 2 in the webbing pulling out or unwinding direction.

Figure 1:
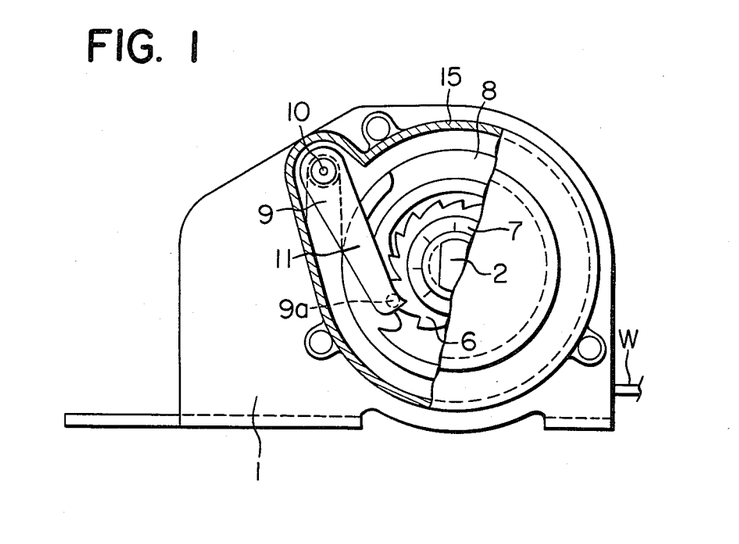
FIG. 1 is a partially cutaway front view of a first embodiment of the invention.
Figure 2:
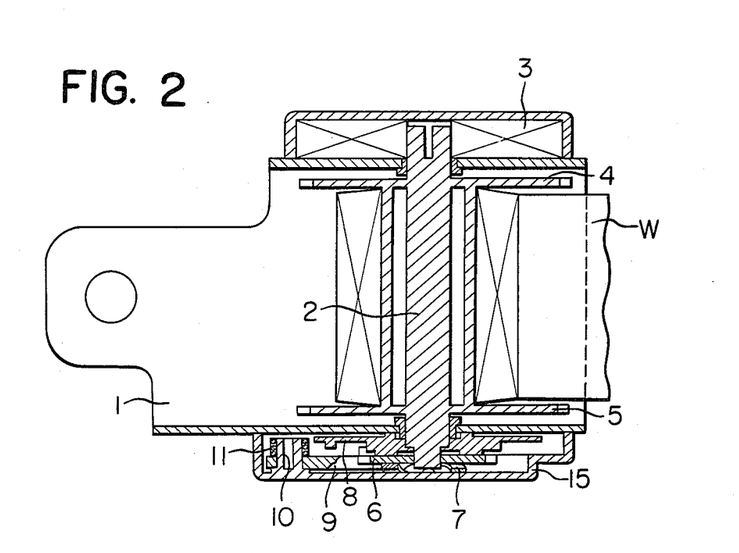
FIG. 2 is a sectional view thereof.

The take-up shaft 2 has also a relatively small ratchet wheel 6 at the extreme end thereof opposite to the end having the spring 3. The engagement surface of the ratchet wheel 6 faces in the webbing taking up direction. The ratchet wheel 6 is fixedly mounted on the shaft 2 relative to rotation thereof and therefore it rotates together with the shaft 2. The ratchet wheel 6 is axially inward pushed by a wave washer 7. On the take-up shaft 2 is mounted also a cam plate 8 sandwiched between the ratchet wheel 6 and the base 1.

In the vicinity of the ratchet wheel 6 there is provided a ratchet 9 pivotable about a pivot 10. The ratchet 9 is disposed engageable with the ratchet wheel 6 to lock the shaft 2 against rotation thereof in the webbing taking up direction. The ratchet 9 is urged by a spring 11 toward its engaged position with the ratchet wheel 6.

The form of the cam plate will be described in detail with reference to FIG. 3.

The cam plate 8 has three guide surfaces, that is, a first guide surface 12, a second guide surface 13 and a third guide surface 14. As seen from FIG. 3, the first guide surface 12 generally extends circumferentially with a central angle of not less than 360°. When the webbing is pulled out, the first guide surface 12 guides the ratchet 9 from the position engaged with the ratchet wheel 6 to a disengaged position from the wheel 6. The second guide surface 13 is so formed as to guide the ratchet 9, when the webbing is taken up after pulled out, to another disengaged position immediately before the engaged position while keeping the ratchet 9 out of engagement with the ratchet wheel 6 and then hold the ratchet 9 in the other disengaged position. Of the second guide surface 13, the portion extending from the beginning point to the entrance point to the holding section for holding the ratchet 9 is common to the end portion of the first guide surface 12. The third guide surface 14 extends from the end of the second guide surface 13 to the beginning of the first guide surface 12. When the webbing is a little pulled out after taken up, the third guide surface 14 guides the ratchet 9 from the position held by the second guide surface 13 to the engaged position.

The ratchet 9 has a projection 9a serving as a cam follower on the guide surfaces 12, 13 and 14, of the cam plate 8. As described above, along the second guide surface 13 of the cam plate 8 the ratchet 9 is guided to the holding section of the second guide surface 13 passing through the entrance thereto provided in the second guide surface 13. The entrance portion to the holding section of the second guide surface 13 is formed in such manner that at the time of the webbing being pulled out, the projection 9a of the ratchet 9 can not fall into the entrance but it can enter the entrance at the time of the webbing being taken up, as seen from the drawing.

The members mentioned above including the cam plate 8 are covered with a cover member 15 fixed to the base 1.

The manner of operation of the above first embodiment is as follows:

FIG. 1 shows the apparatus in the position in which a driver or passenger wears the seat belt. In this position, the tooth of the ratchet 9 is in mesh with a tooth of the ratchet wheel 6 to lock the take-up shaft 2 against rotation thereof in the webbing taking up direction. Therefore, the spring force of the take-up spring 3 can not be applied to the wearer through the webbing. Accordingly, in this position, no pressure is applied to the wearer. However, since the engagement surface of the ratchet wheel 6 faces in the webbing taking up direction, it is allowed to pull out the webbing from the position shown in FIG. 1. FIG. 3 shows the apparatus in the position after the webbing has been pulled out a little from the position shown in FIG. 1. When the webbing is pulled out to the position shown in FIG. 3, the cam plate 8 rotates counterclockwise together with the take-up shaft 2 through frictional engagement with the ratchet wheel 6. As the cam plate 8 rotates counterclockwise, the ratchet projection 9a rides on the circular part 12b from the chordal part 12a of the first guide surface 12 and therefore the ratchet 9 is disengaged from the ratchet wheel 6. The webbing taking up force of the spring 3 is then restored. Therefore, if the force for pulling out the webbing against the take-up spring 3 is lost, for example, at the position shown in FIG. 3, then the pulled webbing will be rewound on the shaft 2 and returned to the position shown in FIG. 1 at once by the spring 3. In this manner, the apparatus always remembers the initial belt wearing position shown in FIG. 1 and allows a pull-out and take-up of the webbing within a certain range from the initial position.

Figure 4:
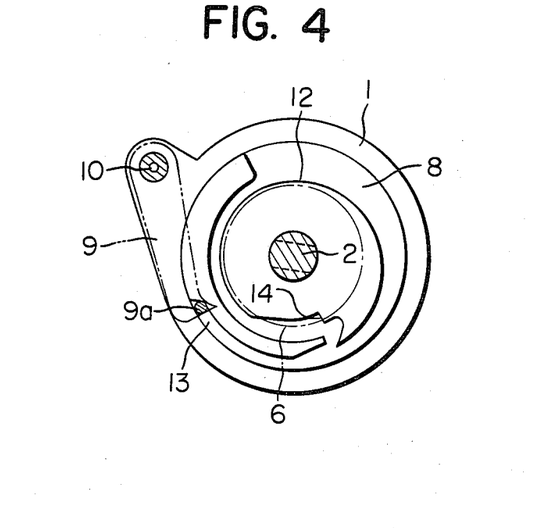

However, when the webbing W is further pulled out beyond this range, for example, up to the position shown in FIG. 4 and the projection 9a of the ratchet 9 is moved relative to the cam plate 8 along the first guide surface 12 thereof to the extent more than 360°, the webbing can no longer return back to the position shown in FIG. 1. In this case, when the force for pulling out the webbing is lost the ratchet projection 9a moves in the opposite direction along the second guide surface 13 and comes into the holding section as indicated by the arrow A in FIG. 5. Since the webbing pulling-out force has been lost, the shaft 2 continues taking up the webbing by the force of the take-up spring 3 while the ratchet 9 remains in the position held by the holding section of the second guide surface 13. In this manner, after the projection 9a of the ratchet has been caught in the holding section of the second guide surface 13, the cam plate 8 remains stopped and only the shaft 2 and the ratchet wheel 6 continue rotating until the webbing W is completely taken up on the shaft 2. After completing the take-up of the webbing, the apparatus waits for the next pull-out of the webbing by a person who will wear the seat belt. Namely, it is the waiting position ready for the next use.

Figure 3:
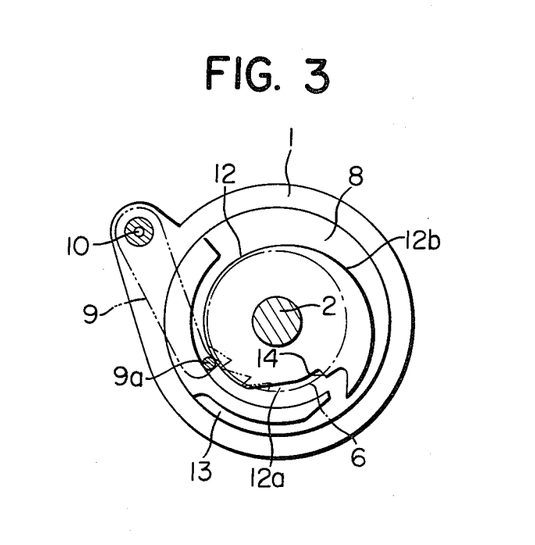
FIGS. 3 to 6 illustrate the manner of operation of the first embodiment.
Figure 5:
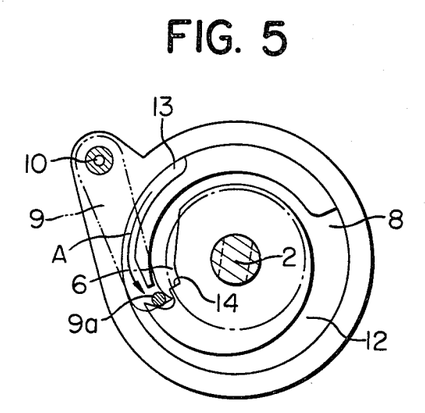
Figure 6:
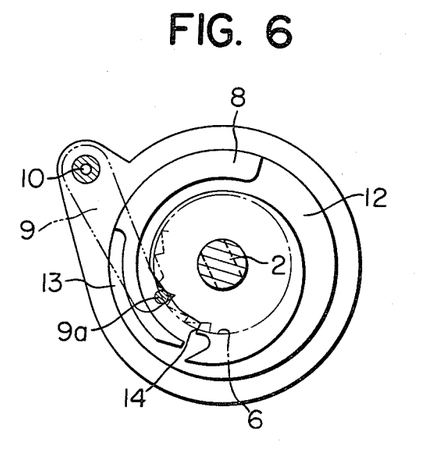

When a person pulls out the webbing from the waiting position to put it on, the apparatus is brought to the position shown in FIG. 4 passing through the positions shown in FIGS. 6 and 3. After the person has pulled out a suitable amount of the webbing and worn it, the webbing W is rewound up a little by the take-up spring 3 so as to fit it to the wearer. This position is shown in FIG. 5. In this position, the wearer pulls out further a small amount of the webbing by his hand or by leaning forward. By doing so, the projection 9a of the ratchet 9 comes to chordal part 12a of the first guide surface 12 passing through the third guide surface 14. Thus, the apparatus is brought to the initial position shown in FIG. 1.

As seen from the foregoing, with the retractor of the present invention, the pressure, namely the webbing taking up force applied to the wearer is moderated and it is made possible to wear the seat belt in a comfortably relaxed state.

Figure 7:
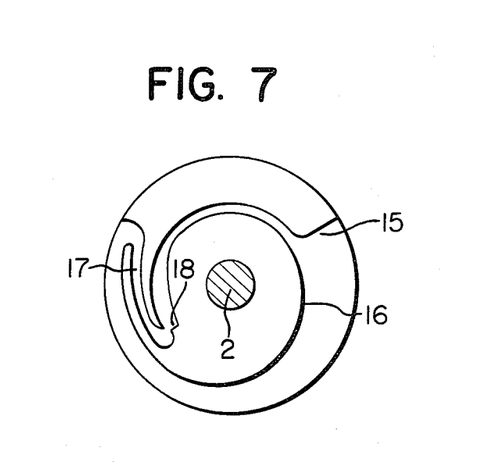
FIG. 7 is a front view of a cam plate of a second embodiment of the invention.

FIG. 7 shows the second embodiment of the invention.

This embodiment is different from the first embodiment in the arrangement of the second guide surface. The first guide surface 16 and the second guide surface 17 of the cam plate 15 in the second embodiment have no common part. Instead, the second guide surface 17 extends radially inwards returning back from the end of the first guide surface 16. With this arrangement, pull-out and take-up of the webbing from the initial position, in which a person wears the seat belt and the webbing taking up force applied to the wearer is moderated, is possible so long as the projection 9a of the ratchet 9 is within the range of the first guide surface 16. Different from the first embodiment, it is unnecessary to provide a particular entrance portion to the ratchet holding section of the second guide surface 17. After the projection 9a of the ratchet 9 has reached the end of the first guide surface 16, the projection 9a can automatically enter the second guide surface 17 under the influence of the biasing force of the spring 11. The third guide surface 18 of the second embodiment is formed in the same manner as in the first embodiment.

Figure 8:
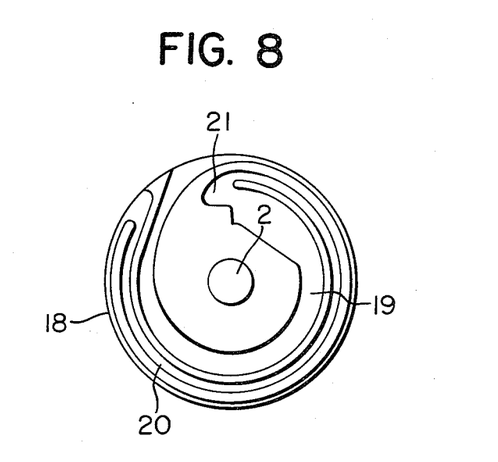
FIG. 8 is a view similar to FIG. 7 showing a third embodiment.

FIG. 8 shows the third embodiment of the invention.

The third embodiment is featured by a long extending first guide surface 19. The first guide surface 19 of the cam plate 18 in this embodiment extends turning round the center of the cam plate 18 nearly two times. From the end of the first guide surface 19, the cam surface of the cam plate 18 is turned back radially inwards to form the second guide surface 20 and the third guide surface 21. Therefore, in this embodiment, the webbing W can be returned to the initial belt wearing position in which the above mentioned tension lock is in effect, even after the webbing has been pulled out to the extent corresponding to about two turns of the take-up shaft 2 from the initial wearing position. This broadens the range within which the belt wearer is allowed to move free.

Figure 9:
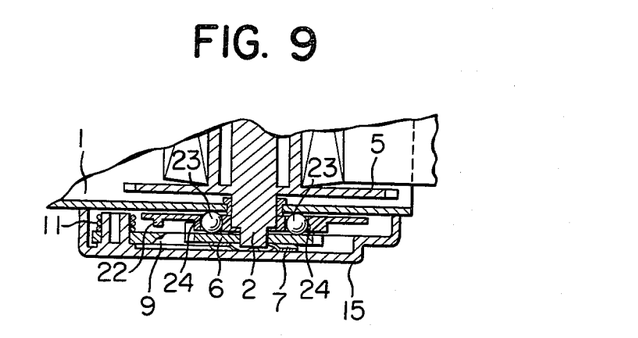
FIG. 9 is a partial sectional view of a fourth embodiment.
Figure 10:
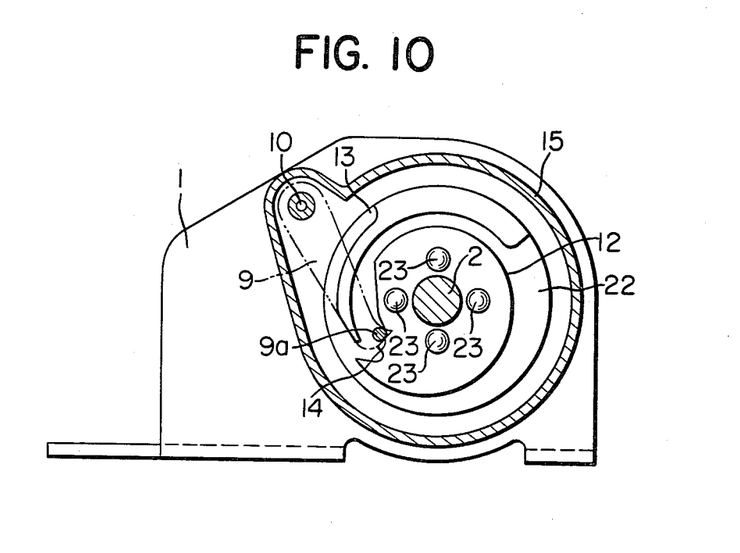
FIG. 10 is a front view thereof.

FIGS. 9 and 10 show the fourth embodiment of the invention wherein like reference numerals to the first embodiment represent the same or corresponding elements.

An important difference between the first and fourth embodiments is in the use of steel balls 23 sandwiched between the ratchet wheel 6 and the base 1. The steel balls 23 are fitted into holes 24 provided in the cam plate 22 for rolling therein. In this embodiment, the cam plate 22 is rotated through the balls 23 which are rolled between the ratchet wheel 6 and the base 1. Consequently, by suitable adjustment of the friction between the ratchet wheel and balls 23 and between balls 23 and base 1, the number of revolutions of the cam plate 22 may be reduced to nearly a half of the number of revolutions of the take-up shaft 2 and therefore of the ratchet wheel 6. Compared with the first embodiment, therefore, the length of the webbing W required to be pulled out from the initial wearing position for taking up the webbing completely or the range allowable for pull-out and take-up of the webbing during wearing the belt becomes about two times larger in this embodiment. An important merit obtainable from the fourth embodiment is found in that a larger range can be set for pull-out and take-up of webbing from the initial wearing position.

Other parts of the fourth embodiment are the same as those of the first embodiment and so is other operation of the fourth embodiment.

Figure 11:
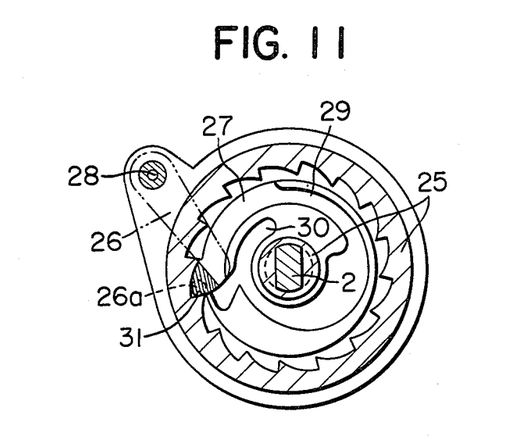
FIGS. 11 and 12 are partial front views of a fifth embodiment illustrating the manner of operation thereof.
Figure 12:
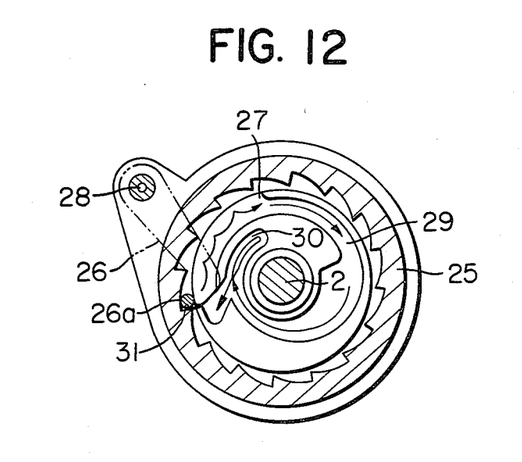

FIGS. 11 and 12 show the fifth embodiment of the invention. In this embodiment, the ratchet wheel 25 is an internal gear. With this change in structure of the ratchet wheel 25, the configurations of the ratchet 26 and the cam plate 27 are changed accordingly as compared with those of the first embodiment. The ratchet 26 is disposed pivotable about a pivot 28 and is biased clockwise. The cam plate 27 again has a first guide surface 29, a second guide surface 30 and a third guide surface 31 as shown in FIGS. 11 and 12. The ratchet 26 has a projection 26a which follows the guide surfaces of the cam plate 27 as indicated by the arrows in FIG. 12. As the belt is unwound, for example, projection 26a will follow the arrow having the curved segments whereby the projection will be captured by guide surface 29.

Other points of the fifth embodiment are the same as those of the first embodiment.

Lastly, the sixth embodiment of the invention will be described hereinafter with reference to FIGS. 13 through 17 wherein like reference numerals to the first embodiment represent the same or corresponding elements.

Figure 13:
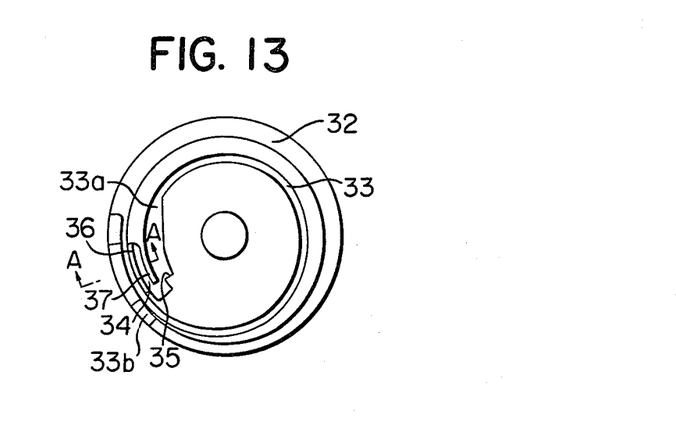
FIG. 13 is a front view of a cam plate of a sixth embodiment of the invention.
Figure 14:
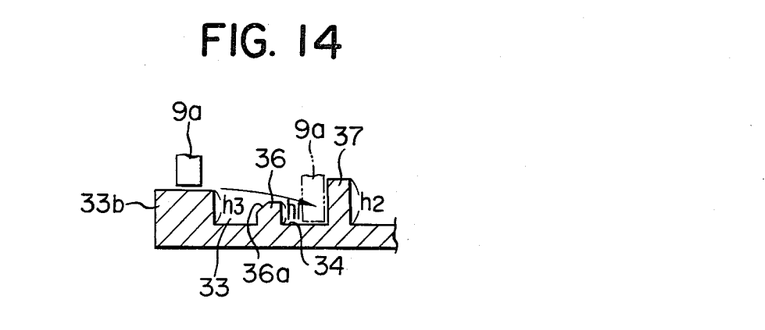
FIG. 14 is a cross section taken along the line A—A in FIG. 13.

In this embodiment is used a cam plate 32 as shown in FIGS. 13 and 14. The cam plate 32 has a spiral first guide surface 33 extending through an angle of more than 720°, a second guide surface 34 having a holding section for holding the ratchet 9, and a third guide surface 35 extending from the end of the second surface 34 to the beginning of the first surface 33. When the webbing is pulled out, the first guide surface 33 guides the ratchet 9 from its position engaged with the ratchet wheel 6 to its position of disengagement from the wheel 6. When the webbing is taken up, the second guide surface 34 guides the ratchet 9 up to a disengaged position immediately before the said engaged position with the wheel 6 while keeping the ratchet 6 out of engagement with the ratchet wheel 6 and then holds the ratchet 9 in its holding section. The function of the third guide surface 35 is to guide the ratchet 9 from the position held by the holding section of the second guide surface 34 to the engaged position when the webbing is pulled out a little.

The first guide surface 33 includes a chordal part 33a formed at its innermost section. So long as the projection 9a of the ratchet 9 rides on the chordal part 33a, the ratchet 9 remains in engagement with the ratchet wheel 6. At the outermost section, the first guide surface 33 has an ascending part 33b along which the projection 9a of the ratchet is gradually raised up.

A circumferential partition wall 36 is formed between the first and second guide surfaces 33 and 34 and a circumferential partition wall 37 is formed between the chordal part 33a of the first guide surface and the second surface 34. Structure and height of these partition walls are schematically shown in FIG. 14 which is a cross-section taken along a line A—A in FIG. 13.

The partition wall 36 is $h_1$ in height and the partition wall 37 is $h_2$. The final height of the ascending part 33b of the first guide surface 33 is $h_3$. As seen from FIG. 14, $h_1$ is smaller than $h_3$ and the partition wall 36 has a chamfered surface 36a at its outer side. The height $h_2$ of the partition wall 37 is so predetermined as not to allow the projection 9a to jump over the wall 37 from the outer side to the inner side. The projection 9a can jump over the wall 36 when the ratchet 9 has been guided to the ascending part 33b and it is inwards moved by the force of the spring member 11. At this time point, the projection 9a runs against the wall 37 passing over the wall 36 without fail and falls in the second guide surface 34 as suggested by the arrow in FIG. 14. The chamfered surface 36a helps the projection 9a to jump over the wall 36 smoothly.

Figure 15:
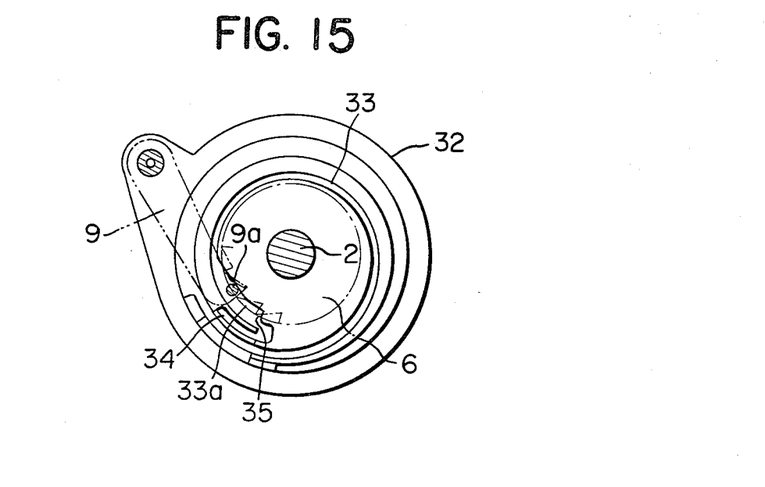
FIGS. 15 through 17 illustrate the manner of operation of the sixth embodiment.

The manner of operation of the above sixth embodiment is as follows:

FIG. 15 shows the apparatus in the initial wearing position in which a person wears the seat belt. In this position, the ratchet 9 is in engagement with a tooth of the ratchet wheel 6 to lock the shaft 2 against rotation in the webbing taking up direction. Therefore, in this initial wearing position, no pressure is applied to the belt wearer by the take-up spring 3 through the webbing. However, since the engagement surface of the ratchet wheel 6 is oriented in the webbing taking up direction, the webbing is allowed to be pulled out from the initial wearing position.

Figure 16:
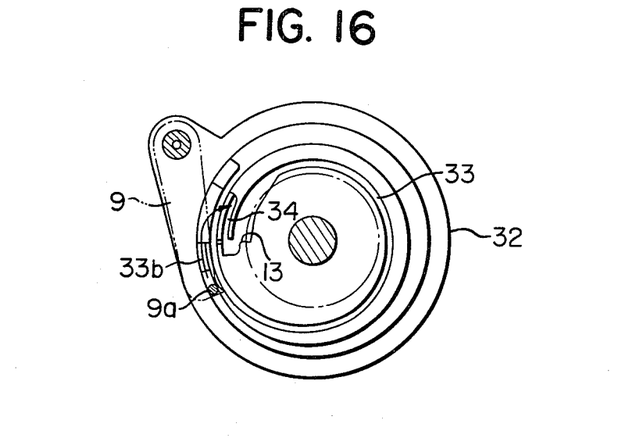

When the webbing is pulled out from the initial position and the cam plate 32 is rotated together with the shaft 2 through frictional engagement with the ratchet wheel 6, the projection 9a of the ratchet 9 is guided from the chordal part 33a to the part of the first guide surface 33 extending in the circumferential direction. As a result, the ratchet 9 is disengaged from the ratchet wheel 6 and thereby the force of the spring 11 for taking up the webbing is restored. Therefore, if the force for pulling out the webbing is lost after the pulling out the webbing to a position as shown in FIG. 16, then the webbing is again taken up on the shaft 2 by the force of the take-up spring 11 and returned back to the initial wearing position shown in FIG. 15 at once. In this manner, the apparatus remembers the initial wearing position. Within a predetermined range corresponding to about two rotations of the shaft 2 from the initial wearing position, pull-out and take-up of the webbing is possible.

However, if the webbing is pulled out through over two turns from the initial wearing position and the projection 9a of the ratchet is guided along the first guide surface 33 up to a position beyond the position shown in FIG. 16, then the projection 9a is introduced into the second guide surface 34 as suggested by the arrow in FIG. 16. Even if the force for pulling out the webbing is lost after the projection being introduced into the second guide surface 34, the projection 9a will be caught in the holding section of the second guide surface 34 as suggested by the arrow in FIG. 17. Namely, this time, the apparatus and the webbing can not be returned back to the initial wearing position shown in FIG. 15. After the webbing pulling-out force is lost, the ratchet 9 is held in the holding section of the second guide surface 34 and the shaft 2 is rotated in the webbing taking up direction by the force of the take-up spring 3 until the webbing is taken up completely on the shaft 2. During this stage of operation, only the shaft 2 and the ratchet wheel 6 continue rotating and the cam plate 32 can not rotate. Thus, the apparatus is brought to the waiting position in which it waits for the next pull-out of the webbing.

Figure 17:
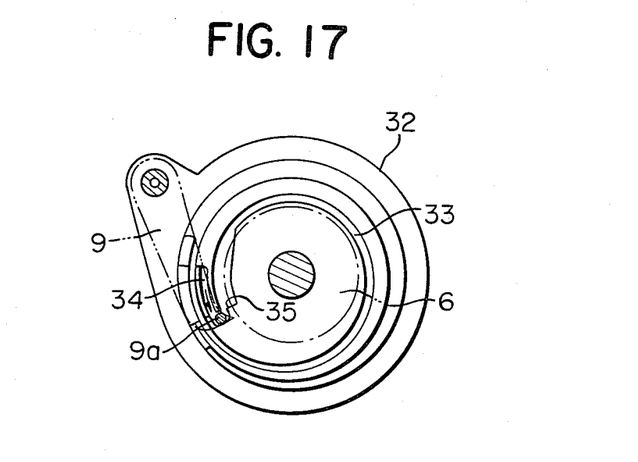

When the webbing is pulled out from the waiting position by a person who wishes to wear the seat belt, the projection 9a is at first moved in the direction opposite to the arrow in FIG. 17 provisionally and thereafter it again gets in the position held by the holding section of the second guide surface 34. Namely, after the person has put the pulled-out webbing W on him, the take-up spring 3 takes up a small amount of the webbing so as to make it fit to the wearer. Next, the wearer pulls out the webbing a little to relax it by his hand or by leaning forward. By doing so, the projection 9a of the ratchet 9 is guided to the beginning of the first guide surface 33 passing through the third guide surface 35 of the cam plate 32. Thus, the apparatus is brought to the initial wearing position shown in FIG. 15 in which no pressure is applied to the wearer by the take-up spring.

All of the above embodiments can be used in various application forms. For example, the retractor may be used in an active belt system with addition to the retractor such mechanism which brings the ratchet forcedly to a disengaged position operatively associated with the releasing motion of the buckle of the seat belt and then holds it in this position. When the retractor of the invention is used in a passive belt system, there may be added such mechanism which brings the ratchet forcedly to a disengaged position operatively associated with the opening motion of the door and holds it in this position. These application forms have advantages that buffer means according to the invention becomes effective only after the door being opened or the buckle being released and that the webbing taking-up force can be restored simultaneously with the opening of door or with the releasing of buckle and therefore there is required no particular operation to take up the full length of the webbing.

While the invention has been particularly shown and described with reference to the preferred embodiments thereof, it will be understood by those skilled in the art that the foregoing and other changes in form and details can be made therein without departing from the spirit and scope of the invention.

I claim:

1. A retractor for seat belt provided with buffer means against webbing taking-up force comprising:
   a webbing take-up shaft rotatably supported on a base member and biased in the webbing taking up direction;
   a ratchet wheel mounted on said take-up shaft for rotation therewith and having engagement surfaces oriented in the webbing taking up direction;
   a ratchet engageable with said ratchet wheel to prevent said take-up shaft from rotating in the webbing taking up direction and biased toward a position engaged with said ratchet wheel; and
   a cam plate rotatable together with said take-up shaft and said ratchet wheel through frictional engagement therewith; and
   said cam plate comprising a first guide portion generally extending in the circumferential direction through an angle of more than 360 degrees and so formed as to guide said ratchet from the engaged position with said ratchet wheel to a position out of engagement with said ratchet wheel with the movement of the webbing being pulled out; a second guide portion generally extending in the circumferential direction a small distance beyond the beginning of said first guide portion and so formed as to guide said ratchet to a disengaged position immediately before the engaged position while keeping said ratchet wheel out of engagement with said ratchet wheel with the movement of the webbing being taken up and then hold said ratchet in said disengaged position; and a third guide portion extending from the end of said second guide portion to the beginning of said first guide portion and so formed as to guide said ratchet from said held position to said engaged position with the movement of the webbing being pulled out.

2. A retractor according to claim 1 wherein a part of said first guide portion extending from a point somewhat beyond the beginning of said first guide portion to the end thereof is common to said second guide portion and wherein said ratchet is guided to the ratchet holding section of said second guide portion only when the webbing is taken up.

3. A retractor according to claim 1 wherein said second guide portion extends returning back radially inwards from the end of said first guide portion and wherein said ratchet automatically falls in said second guide portion by the biasing force acting on said ratchet toward the engaged position thereof, when said ratchet reaches the end of said first guide portion.

4. A retractor according to claim 3 wherein said first guide portion extends through an angle of more than 720 degrees.

5. A retractor according to claim 1 wherein steel balls are mounted on said cam plate rotatable between said base member and said ratchet wheel through frictional engagement with said ratchet wheel so that said cam plate rotates operatively associated with said take-up shaft and said ratchet wheel but at a rate of half angle of rotation relative to that of the latter.

6. A retractor according to claim 1 wherein said first guide portion generally extends in the circumferential direction through an angle of more than 720 degrees with the height of its bottom ascending toward the end of said first guide portion and wherein a partition wall extending between the middle part of said first guide portion and said second guide portion has a height lower than the height of the end part of said first guide portion so that said ratchet can be guided to said second guide portion from the end part of said first guide portion over the middle part of said first guide portion.

7. A retractor according to claim 6 wherein said partition wall has a chamferred surface at its outer side.

8. A retractor according to claim 6 wherein a partition wall extending between the beginning part of said first guide portion and said second guide portion has a sufficient height enough to introduce said ratchet arriving at said second guide portion from the end of said first guide portion into said second guide portion without fail.

* * * * *